(12) United States Patent
Nishimaki

(10) Patent No.: US 12,120,231 B2
(45) Date of Patent: Oct. 15, 2024

(54) DIGITAL WATERMARK SYSTEM, DIGITAL WATERMARK METHOD AND PROGRAM

(71) Applicant: NIPPON TELEGRAPH AND TELEPHONE CORPORATION, Tokyo (JP)

(72) Inventor: Ryo Nishimaki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 239 days.

(21) Appl. No.: 17/774,828

(22) PCT Filed: Nov. 11, 2019

(86) PCT No.: PCT/JP2019/044170
§ 371 (c)(1),
(2) Date: May 5, 2022

(87) PCT Pub. No.: WO2021/095103
PCT Pub. Date: May 20, 2021

(65) Prior Publication Data
US 2022/0407698 A1    Dec. 22, 2022

(51) Int. Cl.
*H04L 9/32* (2006.01)
*H04L 9/08* (2006.01)

(52) U.S. Cl.
CPC .............. *H04L 9/32* (2013.01); *H04L 9/0825* (2013.01); *H04L 2209/608* (2013.01)

(58) Field of Classification Search
CPC ....... H04L 9/32; H04L 9/0894; H04L 9/0825; H04L 2209/608; H04N 1/32; G09C 1/00
See application file for complete search history.

(56) References Cited

U.S. PATENT DOCUMENTS 6,807,285 B1 * 10/2004 Iwamura ............ H04N 1/32352
726/32
2004/0103293 A1 * 5/2004 Ryan .................. H04N 21/8358
713/193

(Continued)

FOREIGN PATENT DOCUMENTS

JP    2005210512 A    8/2005

OTHER PUBLICATIONS

Goyal et al. (2019) "Watermarking public-key cryptographic primitives" in Alexandra Boldyreva and Daniele Micciancio, editors, CRYPTO 2019, Part III, vol. 11694 of LNCS, pp. 367-398. Springer, Heidelberg, Aug. 2019.

(Continued)

*Primary Examiner* — Abiy Getachew

(57) ABSTRACT

A digital watermark system that realizes digital watermark for a cryptographic function, including a memory and a processor configured to take as input a security parameter and generate a watermark embedding key for embedding information representative of a watermark in a circuit that realizes the cryptographic function, and a watermark extraction key for extracting information representative of the watermark from a circuit in which a watermark is embedded; take as input a master private key used for the cryptographic function, the watermark embedding key, and information representative of a watermark, and generate a circuit in which the watermark is embedded and that realizes the cryptographic function; and take as input the watermark extraction key and the circuit in which the watermark has been embedded, and extract information representative of a watermark from the circuit.

6 Claims, 3 Drawing Sheets

(56) References Cited

U.S. PATENT DOCUMENTS

| | | | | |
|---|---|---|---|---|
| 2005/0193206 A1* | 9/2005 | Kunisa | .................. | H04L 9/3247 713/176 |
| 2005/0201561 A1 | 9/2005 | Yuichi et al. | | |
| 2012/0300975 A1* | 11/2012 | Chalamala | ............ | G06F 18/254 382/100 |
| 2019/0222878 A1* | 7/2019 | Cocchi | .................. | H04N 5/913 |

OTHER PUBLICATIONS

Boneh et al. (2004) "Efficient selective-ID secure identity based encryption without random oracles" in Christian Cachin and Jan Camenisch, editors, EUROCRYPT 2004, vol. 3027 of LNCS, pp. 223-238. Springer, Heidelberg, May 2004.

Attrapadung et al. (2015) "New security proof for the Boneh-Boyen IBE: Tight reduction in unbounded multichallenge security" in Lucas Chi Kwong Hui, S. H. Qing, Elaine Shi, and S. M. Yiu, editors, ICICS 14, vol. 8958 of LNCS, pp. 176-190. Springer, Heidelberg, Dec. 2015.

Hofheinz et al. (2011) "Short signatures from weaker assumptions" in Dong Hoon Lee and Xiaoyun Wang, editors, ASIACRYPT 2011, vol. 7073 of LNCS, pp. 647-666. Springer, Heidelberg, Dec. 2011.

Eike Kiltz (2006) "Chosen-ciphertext security from tag-based encryption" in Shai Halevi and Tal Rabin, editors, TCC 2006, vol. 3876 of LNCS, pp. 581-600. Springer, Heidelberg, Mar. 2006.

Agrawal et al. (2010) "Efficient lattice (H)IBE in the standard model" in Henri Gilbert, editor, EUROCRYPT 2010, vol. 6110 of LNCS, pp. 553-572.

Boneh et al. (2014) "Fully key-homomorphic encryption, arithmetic circuit ABE and compact garbled circuits" in Phong Q. Nguyen and Elisabeth Oswald, editors, EUROCRYPT 2014, vol. 8441 of LNCS, pp. 533-556. Springer, Heidelberg, May 2014.

Rotem Tsabary (2017) "An equivalence between attribute-based signatures and homomorphic signatures, and new constructions for both" in Yael Kalai and Leonid Reyzin, editors, TCC 2017, Part II, vol. 10678 of LNCS, pp. 489-518. Springer, Heidelberg, Nov. 2017.

Bohl et al. (2015) "Confined guessing: New signatures from standard assumptions" Journal of Cryptology, 28 (1):176-208, Jan. 2015.

Goyal et al. (2019) "Watermarking Public-Key Cryptographic Primitives" Annual International Cryptology Conference CRYPTO 2019, Aug. 1, 2019, p. 1-64 (p. 367-398).

Boneh et al. (2004) "Efficient selective-ID secure identify based encryption without random oracles" International Conference on the Theory and Applications of Cryptographic Techniques EUROCRYPT 2004, vol. 3027 of LNCS, 2004, p. 223-238.

Cohen et al (2016) non-official translation "Can cryptography electronically realize traces of coffee stains?" SCIS2016 Symposium on Cryptography and information Security, Jan. 19, 2016, pp. 1-8, fig. 3, 4, with English Machine Translation.

* cited by examiner

DIGITAL WATERMARK SYSTEM, DIGITAL WATERMARK METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/044170, filed on 11 Nov. 2019, the disclosure of which is hereby incorporated herein by reference in its entirety.

TECHNICAL FIELD

The present invention relates to a digital watermark system, a digital watermark method, and a program.

BACKGROUND ART

Digital watermark is a widely used technique of embedding information of a right holder, creator, or the like in contents such as images or music to verify their authenticity. An extension of digital watermark called "program watermark" is also being researched, which is a technique to embed some information in a program in an unremovable manner without causing a change in the operation of the program.

Digital watermark applied to cryptographic functions is one type of program watermark. Multiple concrete methods of implementing digital watermark for pseudorandom functions have been proposed. Digital watermarking for public-key cryptography, which offers convenient use because the keys can be made public, has also been proposed (NPL 1).

CITATION LIST

Non Patent Literature

[NPL 1] Rishab Goyal, Sam Kim, Nathan Manohar, Brent Waters, and David J. Wu. Watermarking public-key cryptographic primitives. In Alexandra Boldyreva and Daniele Micciancio, editors, CRYPTO 2019, Part III, volume 11694 of LNCS, pages 367-398. Springer, Heidelberg, August 2019.

SUMMARY OF THE INVENTION

Technical Problem

However, the digital watermarking for public-key cryptography described in NPL 1 listed above is not constructed on the basis of a specific computationally difficult problem but merely suggests the feasibility of digital watermarking when the presence of a certain cryptographic function is assumed, and would be extremely inefficient if implemented at all.

The present invention was made in view of the issue described above, with an object to realize efficient digital watermark.

Means for Solving the Problem

To achieve the above object, the digital watermark system according to one embodiment, which is a digital watermark that realizes digital watermark for a cryptographic function, includes a memory and a processor configured to take as input a security parameter and generate a watermark embedding key for embedding information representative of a watermark in a circuit that realizes the cryptographic function, and a watermark extraction key for extracting information representative of the watermark from a circuit in which a watermark is embedded; take as input a master private key used for the cryptographic function, the watermark embedding key, and information representative of a watermark, and generate a circuit in which the watermark is embedded and that realizes the cryptographic function; and take as input the watermark extraction key and the circuit in which the watermark has been embedded, and extract information representative of a watermark from the circuit.

Effects of the Invention

Efficient digital watermark can be realized.

DESCRIPTION OF EMBODIMENTS

Figure 1:
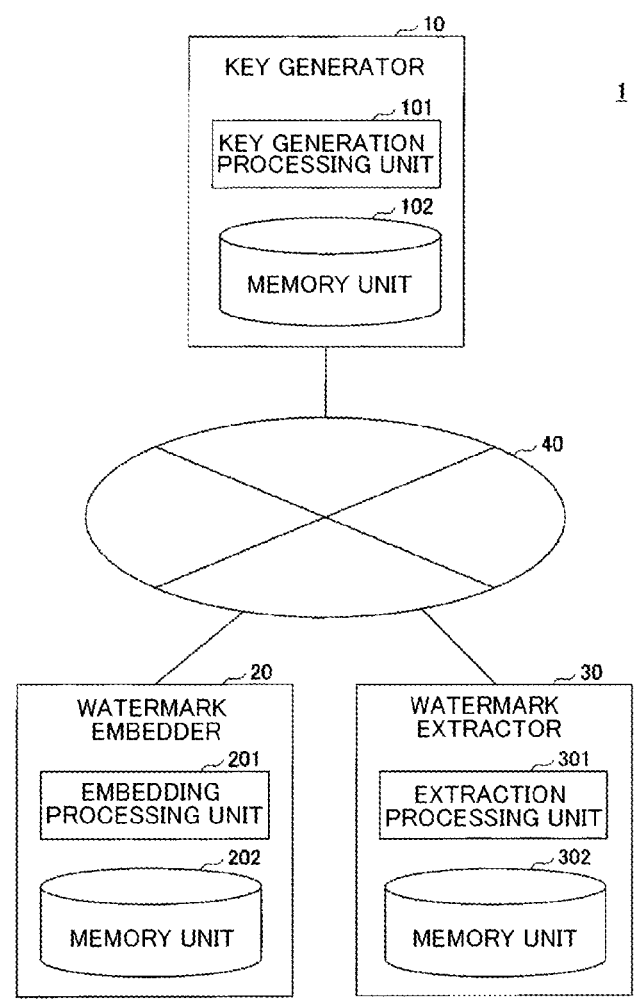
FIG. 1 is a diagram illustrating one example of an overall configuration of a digital watermark system according to one embodiment.

Hereinafter, one embodiment of the present invention will be described. In this embodiment, a digital watermark system 1 that realizes efficient digital watermark will be described.

<Theoretical Configuration>

First, the theoretical configuration of this embodiment will be described. Regarding functions f, f≤negl represents a negligible function, and f>negl represents a non-negligible function. A circuit is denoted as C: D→R, and families of circuit C (circuit families) are denoted as $$\mathcal{C} \quad \text{[Formula 1]}$$

The circuit here refers to a program that realizes a cryptographic function (e.g., encryption, decryption, signature generation, and so on). In this embodiment, the circuit is represented as a deterministic algorithm (i.e., algorithm that is not a probabilistic algorithm).

Definition 1 (Program watermark) Circuit Families

A program watermark scheme Σ for circuit families $$\mathcal{C} \quad \text{[Formula 2]}$$

is made up of three algorithms (WMSetup, Mark, Extract) and has the following features.

WMSetup: The setup algorithm WMSetup ($1^\lambda$) takes as input a security parameter $1^\lambda$, and outputs a watermark embedding key mk and a watermark extraction key xk.

Mark: The watermark embedding algorithm Mark (mk, C, ω) takes as input the watermark embedding key mk, a circuit $$c \in \mathcal{C} \quad \text{[Formula 3]}$$

and a watermark ω, and outputs a circuit $$\tilde{C} \quad \text{[Formula 4]}$$

Extract: The watermark extraction algorithm Extract (xk, C') takes as input the watermark extraction key xk and a circuit C', and outputs a watermark ω' or a special value (unmarked).

The scheme is referred to as public-watermark embedding when the watermark embedding key mk can be made public, and referred to as public-watermark extraction when the watermark extraction key xk can be made public. The following presupposes that this embodiment handles public-watermark embedding and public-watermark extraction schemes.

Definition 2 (Correctness) Circuit Families

The program watermark scheme (WMSetup, Mark, Extract) for circuit families $$\mathcal{C} \quad \text{[Formula 5]}$$

satisfying a correctness condition equals to satisfying the following two features (i.e., extraction correctness and function retainability conditions).

The extraction correctness condition is satisfied when all the watermarks $\omega \in \{0, 1\}^N$, circuits $$C \in \mathcal{C} \quad \text{[Formula 6]}$$

and key pairs $(mk, xk) \leftarrow \text{WMSetup}(1^\lambda)$ satisfy $$Pr[\text{Extract}(xk, \text{Mark}(mk, C, \omega)) \neq \omega] \leq \text{negl},$$

where $\{0, 1\}^N$ represents a set of n-bit-length strings.

The function retainability condition is satisfied when there is a negligible function $\nu$, and when all the watermarks $\omega \in \{0, 1\}^N$, all the circuits $$C \in \mathcal{C} \quad \text{[Formula 7]}$$

and all the inputs $x \in D$ satisfy $$Pr[(x) = \tilde{C}(x) | (mk, xk) \leftarrow \text{WMSetup}(1^\lambda), \tilde{C} \leftarrow \text{Mark}(mk, C, \omega)] \geq 1 - \nu(\lambda) \quad \text{[Formula 8]}$$

The extraction correctness means that an embedded watermark can be extracted correctly from a circuit in which a correctly generated watermark has been embedded. The confidentiality retainability means that a circuit before a watermark is embedded therein and a circuit after a watermark has been embedded therein produce the same output to all inputs with a sufficiently high probability.

Definition 3 ($\varepsilon$-unremovability)

When all the probabilistic polynomial-time (hereinafter, PPT) algorithms $$\mathcal{A} \quad \text{[Formula 9]}$$

satisfy $$Pr[\text{Exp } t^{urmv}_{\mathcal{A}, WM}(\lambda, \in) = 1] \leq \text{negl}(\lambda) \quad \text{[Formula 10]}$$

the watermark is $\varepsilon$-unremovable, where $\varepsilon$ is a parameter called the degree of approximation, and $$\text{Exp } t^{urmv}_{\mathcal{A}, WM}(\lambda, \epsilon) \quad \text{[Formula 11]}$$

is a security game defined by the following (1-1) to (1-3), with a PPT algorithm $$\mathcal{A} \quad \text{[Formula 12]}$$

as an adversary.

(1-1) The adversary commits a target watermark $\omega^* \in \{0, 1\}^N$.

(1-2) The challenger generates $(mk, xk) \leftarrow \text{WMSetup}(1^\lambda)$, selects a circuit $$C \in \mathcal{C} \quad \text{[Formula 13]}$$

and generates a circuit $$\tilde{C} \leftarrow \text{Mark}(mk, C, \omega^*) \quad \text{[Formula 14]}$$

with a watermark embedded therein, and gives the adversary $$(mk, xk, \tilde{C}) \quad \text{[Formula 15]}$$

(1-3) Lastly, the adversary outputs a circuit C*. If the adversary is tolerant and if Extract (xt, C*)≠ω*, this experiment outputs 1, and if not, outputs 0. Here, the adversary being tolerant means that the circuit C* output by the adversary satisfies the following.

$$Pr[C^*(x) = C(x) | x \leftarrow D] \geq \varepsilon$$

The tolerance requests that the circuit C* output by the adversary operates basically the same as the original circuit C. The definition of the tolerance of digital watermarks for public-key cryptography or digital signatures is more relaxed. Namely, if C and C* are a signature generator circuit, it is translated to the probability that C and C* are a circuit that generates a correct signature being $\varepsilon$ or more. Similarly, if C and C* are a decryption circuit of public-key cryptography, it is translated to the probability that C and C* are a circuit that generates a correct decryption result being $\varepsilon$ or more. For more details of these relaxed definitions, see NPL 1 listed above.

<<All-But-One Security Proof>>

Modern encryption schemes are basically constructed based on a computational problem, and security is mathematically proved based on the difficulty of that problem. A typical security proof technique assumes the existence of an adversary that breaks a certain encryption scheme, and solves a prime factorization problem using this adversary. This constitutes a security proof because a prime factorization problem is a difficult problem, and it is reasoned that the initial assumption that an adversary that breaks this encryption scheme exists is wrong, and therefore this encryption scheme is secure (proven by contradiction). For example, the Rabin scheme is a public-key encryption scheme based on a prime factorization problem. Assuming that there is an adversary algorithm that breaks the Rabin scheme, it can be shown that the prime factorization is made possible by using this algorithm. This way, a specific algorithm that solves a computationally difficult problem can be written if it is assumed that there exists an adversary algorithm that breaks an encryption scheme. This is called a reduction algorithm. This can be rephrased more formally as follows: Where n that represents a computationally difficult problem, Rela that represents an algorithm that takes as input a computationally difficult problem and an answer to that problem and outputs 1-bit information indicating whether or not this answer is correct, $$\mathcal{R} \quad \text{[Formula 16]}$$

that represents a reduction algorithm (i.e., algorithm that tries to solve a computationally difficult problem), and $$\mathcal{A} \quad \text{[Formula 17]}$$

that represents an algorithm that breaks an encryption satisfy $$Pr[\text{Rela}(\pi, \mathcal{R}, \mathcal{A}(\pi)) = 1] > \text{negl}(\lambda) \quad \text{[Formula 18]}$$

it can be said that the encryption is secure based on this computationally difficult problem. Here, $$\mathcal{R}[\mathcal{A}] \quad \text{[Formula 19]}$$

indicates that the reduction algorithm $$\mathcal{R} \quad \text{[Formula 20]}$$

uses the algorithm that breaks an encryption $$\mathcal{A} \quad \text{[Formula 21]}$$

as a subroutine.

Among various types of security proof, one of the proof techniques widely used in cryptographic theories is called "all-but-one security proof". The all-but-one security proof is explained below, with reference to ID-based encryption as a specific example. ID-based encryption is defined as follows.

Definition 4 (ID-Based Encryption)

First, let us assume the following:

$\mathcal{PT}$ :Plain Text $\mathcal{ID}$ :ID Space [Formula 22]

An ID-based encryption scheme is made up of four algorithms (Setup, KG, Enc, Dec) and has the following features.

Setup: A setup algorithm Setup ($1^\lambda$) takes as input a security parameter $1^\lambda$ and outputs a master private key MSK and a public key (master public key) MPK.

KG: A key generation algorithm KG (MSK, id) takes as input the master private key MSK and an ID $id \in \mathcal{ID}$ [Formula 23]

and outputs a private key $sk_{id}$ for the id.

Enc: An encryption algorithm Enc (MPK, id, m) takes as input the public key MPK, an ID $id \in \mathcal{ID}$ [Formula 24]

and a plain text $m \in \mathcal{PT}$ [Formula 25]

and outputs a ciphertext ct.

Dec: A decryption algorithm Dec ($sk_{id}$, ct) takes as input the private key $sk_{id}$ and ciphertext ct, and outputs $m' \in \mathcal{PT}$ [Formula 26]

or ⊥ that denotes failure of decryption.

The ID-based encryption requires the following correctness.

The correctness requirement is satisfied when all the plain texts m, all the $Id_{id}$, all the (MSK, MPK)←Setup ($1^\lambda$), and all the $sk_{id}$←KG (MSK, id) satisfy $Dec(sk_{id}, Enc(MPK, id, m)) = m$.

Namely, the correctness means that a public key and an individual's ID are used for encryption, and a private key corresponding to the ID allows a ciphertext to be decrypted under this ID.

Definition 5 (Selective Security)

With a PPT algorithm $\mathcal{A}$ [Formula 27]

as an adversary, the selective security of an ID-based encryption scheme IBE=(Setup, Kg, Enc, Dec) is defined through an experiment between an adversary and a challenger $\text{Exp } t_\mathcal{A}^{ibe}(1^\lambda, b)$ [Formula 28]

which is defined by the following (2-1) to (2-6):

(2-1) The adversary commits a challenge ID $id^* \in \mathcal{ID}$ [Formula 29]

(2-2) The challenger generates (MSK, MPK)←Setup ($1^\lambda$), and gives a public key MPK to the adversary.

(2-3) The adversary can query the challenger for an ID $id \in \mathcal{ID}$ [Formula 30]

that satisfies id≠id*. In response to this query, the challenger generates $sk_{id}$←KG ($1^\lambda$, MSK, id) and gives it to the adversary. This can be repeated any number of times.

(2-4) At one time point, the adversary sends two plain texts $m_0^*$, $m_1^*$ as challenge plain texts to the challenger. The challenger generates $ct^* \leftarrow$ Enc (MPK, $id^*$, $m_b^*$) and sends it to the adversary. Here, $b \in \{0, 1\}$.

(2-5) Similarly to (2-3) above, the adversary can query the challenger again for an id that satisfies id≠id*.

(2-6) The adversary outputs a bit $b' \in \{0, 1\}$. This experiment outputs b' as it is.

Here, the ID-based encryption scheme IBE is selectively secure when all the PPT algorithms $\mathcal{A}$ [Formula 31]

satisfy the following:

$Adv_\mathcal{A}^{ibe} := |Pr[\text{Exp } t_\mathcal{A}^{ibe}(1^\lambda, 0) = 1] - Pr[\text{Exp } t_\mathcal{A}^{ibe}(1^\lambda, 1) = 1]|$
$\leq negl(\lambda)$ [Formula 32]

Namely, even if the adversary is given a private key corresponding to an ID other than id* that is the target ID, the adversary cannot determine whether the ciphertext under id* is an encryption of $m_0^*$ or an encryption of $m_1^*$.

To prove the security of an ID-based encryption, it is necessary to construct a reduction algorithm, as described above. In the case of an ID-based encryption, the adversary is allowed to obtain a private key corresponding to an ID other than id*, and therefore, in order for the adversary to operate correctly, the reduction algorithm must give $sk_{id}$ (id≠id*) to the adversary. This is called a private key simulation (by the reduction algorithm). The reduction algorithm also needs to give the public key MPK to the adversary.

While all-but-one security proof cannot generate the private key for id* (this does not cause the security proof any issue because the adversary is not allowed to make a query for the id*), a reduction algorithm that is able to generate a private key $sk_{id}$ to a given id (id≠id*) is constructed. The term "all-but-one" derives from this structure. This can be rephrased more formally as follows: Given there exists a simulation algorithm OSim, which is given n and id* as initial input and outputs the correct public key MPK first, and outputs the correct private key $sk_{id}$ when a query is made for an id (id≠id*). Since the circuit is deterministic in this embodiment, when representing a probabilistic algorithm with a circuit, it is necessary to explicitly give a random number of a probabilistic algorithm as input to the circuit. For this reason, the random number space of OSim in the following is denoted as $\mathcal{R}_{mka}$ [Formula 33]

<<All-but-N Security Proof>>

The all-but-one described above can be extended to all-but-N. Namely, when, while no private keys can be generated for $id_1^*, \ldots, id_N^*$, there exists a reduction algorithm that is able to generate the private key $sk_{id}$ to a given id $id \notin \{id_1^*, \ldots, id_N^*\}$ [Formula 34]

this is called all-but-N security proof. In this case, OSim is given n and ($id_1^*, \ldots, id_N^*$) as initial input and outputs the correct public key MPK first, and outputs the correct private key $sk_{id}$ when a query is made for an id, where $id \notin \{id_1^*, \ldots, id_N^*\}$ [Formula 35]

The reduction algorithm can simulate the public key MPK from n, and can also simulate n, conversely, from the master private key MSK. This algorithm is denoted as MSK-P. Namely, MSK-P (MSK, ($id_1^*, \ldots, id_N^*$)) outputs n.

Generally, an answer to a query sent to the challenger (this query and answer respectively correspond to id and $sk_{id}$ in IBE) can be validated if the sent query has been generated by a correct procedure. This validation algorithm is denoted as Valid. Namely, Valid (MPK, query, answer) outputs ⊤ [Formula 36]

which indicates that the answer is correct, or ⊥, which indicates that the answer is invalid.

<<Digital Watermark that Uses Reduction Algorithm of All-but-N Security Proof>>

On the basis of the above preliminary description, a digital watermark scheme msWM$_\Sigma$ for the master private key of a public-key encryption scheme $\Sigma$ will be described in this embodiment, using a reduction algorithm of an all-but-N security proof.

First, some notations are given. For $\mu \in \{0, 1\}^N$ and $\{x_{i,b}\}_{i \in [N], b \in \{0, 1\}}$, we define as follows:

$$x_\mu := (x_{1,\mu_1}, \ldots, x_{N,\mu_N}) \quad \text{[Formula 37]}$$

[N] represents a set $\{1, \ldots, N\}$, and $\mu_j$ ($j \in [N]$) represents the j-th bit of $\mu$.

When a probabilistic algorithm A is written as A (x; r), it represents the algorithm A being run with input x and random number r.

Then the digital watermark scheme msWM$_\Sigma$=(Gen, Mark, Extract) for the master private key of a public-key encryption scheme $\Sigma$ is constructed by the following.

Gen: The key generation algorithm Gen ($1^\lambda$) takes as input a security parameter generates a bit string $t_{i,b}$ for each $i \in [N]$ and $b \in \{0, 1\}$, and outputs the watermark embedding key mk and watermark extraction key xk as mk: =xk:=$\{t_{i,b}\}_{i \in [N], b \in \{0, 1\}}$.

Since the watermark embedding key mk and watermark extraction key xk can both be made public, the digital watermark scheme msWM$_\Sigma$ is a public watermark embedding scheme and a public watermark extraction scheme.

Mark: The watermark embedding algorithm Mark (mk, MSK, $\omega$) takes as input the watermark embedding key mk, master private key MSK, and watermark $\omega \in \{0, 1\}^N$, executes operations described in Step 11 and Step 12 below, and outputs a circuit $$\tilde{f}_{MSK}[\pi, t_\omega] \quad \text{[Formula 38]}$$

with a watermark embedded therein.

Step 11) A computationally difficult problem $\pi$ is generated by running the algorithm MSK-P (MSK, $t_\omega$). As defined above, $t_\omega$ represents $$t_\omega = (t_{1,\omega_1}, \ldots, t_{N,\omega_N}) \quad \text{[Formula 39]}$$

Step 12) A circuit defined by the following (a) to (d) is output as a circuit with a watermark embedded therein $$\tilde{f}_{MSK}[\pi, t_\omega] \quad \text{[Formula 40]}$$

(a) Values hard-coded in the circuit: $\pi$, $t_\omega$
(b) Input to the circuit: Query in security proof and random number $$\rho_o \in \mathcal{R}_{mka} \quad \text{[Formula 41]}$$

used when generating the answer.

(c) Processing by the circuit: Calculations of answer←O-Sim ($\pi$, $t_\omega$, query; $\rho_o$)
(d) Output from the circuit: Answer Extract: The watermark extraction algorithm Extract (xk, f') takes as input the watermark extraction key xk and the circuit f' from which the watermark is to be extracted, executes the operations described in the following Step 21 to Step 23, and outputs either ⊥ that denotes failure of watermark extraction, or a watermark $\omega'$.

Step 21) T is set as T:=$\lambda/\epsilon$, where $\epsilon$ is the parameter in unremovability of digital watermark ($\epsilon$-unremovability).

Step 22) For each $i \in [N]$, $b \in \{0, 1\}$, and $j \in [T]$, random number $$\rho_{o,j} \in \mathcal{R}_{mka} \quad \text{[Formula 42]}$$

is generated, a query $$\text{query}_{i,b}^{(j)} := t_{i,b} \quad \text{[Formula 43]}$$

is set, and the answer $$\text{answer}_{i,b}^{(j)} \leftarrow \tilde{f}'(\text{query}_{i,b}^{(j)}, \rho_{o,j}) \quad \text{[Formula 44]}$$

is calculated. The total number of $j \in [T]$ that satisfy $$\text{Valid}(MPK, \text{query}_{i,b}^{(j)}, \text{answer}_{i,b}^{(j)}) = T \quad \text{[Formula 45]}$$

is denoted as:

$$\hat{N}_{i,b} \quad \text{[Formula 46]}$$

Step 23) If there exists an index $i \in [N]$ that satisfies $$\hat{N}_{i,0} = \hat{N}_{i,1} = 0 \text{ Or } \hat{N}_{i,0}, \hat{N}_{i,1} \geq 1 \quad \text{[Formula 47]}$$

then ⊥ is to be output. If not, $\omega_i' \in \{0, 1\}$ is a unique bit that satisfies $$\hat{N}_{i,\omega_i'} = 0 \wedge \hat{N}_{i,1-\omega_i'} \geq 1 \quad \text{[Formula 48]}$$

for each $i \in [N]$, and $\omega'$: $=\omega_1' \ldots \omega_N'$ is to be output.

The digital watermark scheme msWM$_\Sigma$ constructed as described above is a secure watermark for the master private key of the encryption scheme $\Sigma$, under an assumption that if the encryption scheme $\Sigma$ is secure based on a computationally difficult problem $\pi$, and has an all-but-N security proof, $\pi$ is a computationally difficult problem. As will be shown in Examples to be described later, efficient digital watermark can be realized because any encryption scheme that is secure based on a specific computationally difficult problem n can be used as the encryption scheme $\Sigma$.

<Overall Configuration of Digital Watermark System 1>

Next, an overall configuration of the digital watermark system 1 according to this embodiment is described with reference to FIG. 1. FIG. 1 is a diagram illustrating one example of an overall configuration of the digital watermark system 1 according to this embodiment.

As illustrated in FIG. 1, the digital watermark system 1 according to this embodiment includes a key generator 10, a watermark embedder 20, and a watermark extractor 30. The key generator 10, watermark embedder 20, and watermark extractor 30 are coupled to each other in a communicable manner via a given communication network 40 such as the Internet, for example.

The key generator 10 is a computer or computer system that generates and outputs watermark embedding keys and watermark extraction keys. The key generator 10 includes a key generation processing unit 101 and a memory unit 102.

The key generation processing unit 101 executes the key generation algorithm Gen ($1^\lambda$) of a digital watermark scheme msWM$_\Sigma$ to generate and output a watermark embedding key mk and a watermark extraction key xk. The key generation processing unit 101 sends the watermark embedding key mk to the watermark embedder 20, and sends the watermark extraction key xk to the watermark extractor 30.

The memory unit 102 stores information necessary for the execution of the key generation algorithm Gen and output results (e.g., watermark embedding key mk and watermark extraction key xk and the like).

The watermark embedder 20 is a computer or computer system that embeds a watermark in a circuit. The watermark embedder 20 includes an embedding processing unit 201 and a memory unit 202.

The embedding processing unit 201 executes the watermark embedding algorithm Mark (mk, MSK, $\omega$) of the digital watermark scheme msWM$_\Sigma$ and outputs a circuit $$\tilde{f}_{MSK}[\pi, t_\omega] \quad \text{[Formula 49]}$$

with a watermark embedded therein. The embedding processing unit 201 sends this circuit with a watermark embedded therein to the watermark extractor 30.

The memory unit 202 stores information necessary for the execution of the watermark embedding algorithm Mark and output results (e.g., circuit with a watermark embedded therein and the like).

The watermark extractor 30 is a computer or computer system that extracts a watermark from a circuit in which the watermark has been embedded. The watermark extractor 30 includes an extraction processing unit 301 and a memory unit 302.

The extraction processing unit 301 executes the watermark extraction algorithm Extract (xk, f') of the digital watermark scheme msWM$_\Sigma$ and outputs an extraction result ($\bot$ that denotes failure of watermark extraction, or a watermark $\omega'$).

The memory unit 302 stores information necessary for the execution of the watermark extraction algorithm Extract and output results (e.g., $\bot$ or $\omega'$ and the like).

<Processing Flow of the Digital Watermark System 1>

Figure 2:
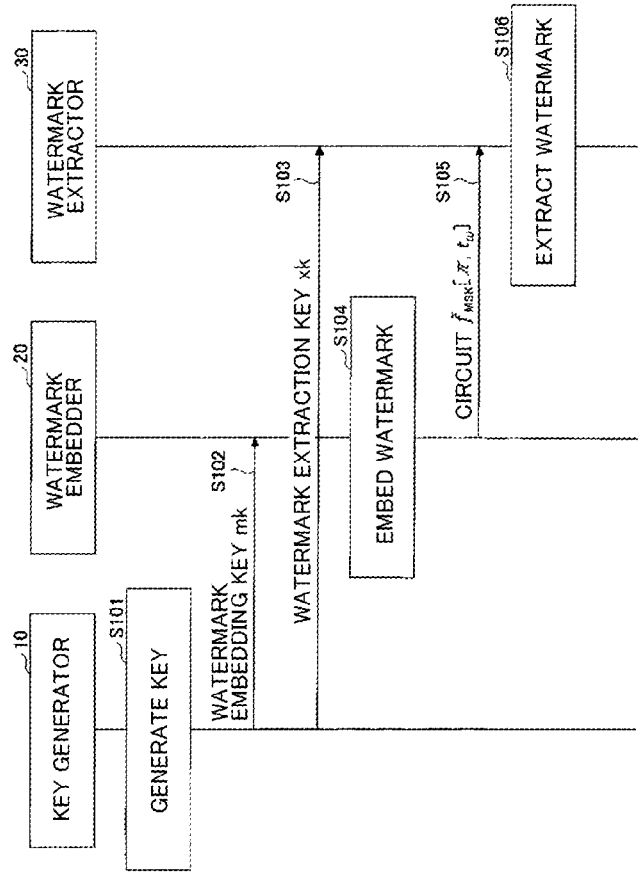
FIG. 2 is a diagram illustrating one example of a processing flow executed by the digital watermark system according to one embodiment.

Next, the flow of processing executed by the digital watermark system 1 according to this embodiment is described with reference to FIG. 2. FIG. 2 is a diagram illustrating one example of a processing flow executed by the digital watermark system 1 according to this embodiment.

First, the key generation processing unit 101 of the key generator 10 executes the key generation algorithm Gen ($1^\lambda$) of a digital watermark scheme msWM$_\Sigma$ to generate and output a watermark embedding key mk and a watermark extraction key xk (step S101). The output keys (mk, xk) are stored in the memory unit 102.

Next, the key generation processing unit 101 of the key generator 10 sends the watermark embedding key mk generated in step S101 described above to the watermark embedder 20 (step S102). The key generation processing unit 101 of the key generator 10 also sends the watermark extraction key xk generated in step S101 described above to the watermark extractor 30 (step S103). Step S102 and step S103 may be performed in any order.

Next, the embedding processing unit 201 of the watermark embedder 20 executes the watermark embedding algorithm Mark (mk, MSK, $\omega$) of the digital watermark scheme msWM$_\Sigma$ and outputs a circuit with the watermark embedded $$\tilde{f}_{MSK}[\pi, t_\omega]$$  [Formula 50]

(step S104). The circuit with the watermark embedded therein is stored in the memory unit 202.

Next, the embedding processing unit 201 of the watermark embedder 20 sends the circuit (with the watermark embedded therein) output in step S104 described above to the watermark extractor 30 (step S105).

The extraction processing unit 301 of the watermark extractor 30 executes a watermark extraction algorithm Extract (xk, f') of the digital watermark scheme msWM$_\Sigma$ and outputs an extraction result ($\bot$ that denotes failure of watermark extraction, or a watermark $\omega'$) (step S106). Here, circuit f' is a circuit from which a watermark is to be extracted, which is, for example, a circuit sent from the watermark embedder 20. The extraction result is stored in the memory unit 302.

EXAMPLES

Since there are a large number of encryption schemes with an all-but-N security proof, the digital watermark system 1 according to this embodiment can use a myriad of secure encryption schemes based on a specific computationally difficult problem $\pi$ as the public-key encryption scheme $\Sigma$. Hereinafter, some of the encryption schemes that can be used as the public-key encryption scheme $\Sigma$ will be described as Examples.

Example 1: Boneh-Boyen ID-Based Encryption Scheme

The Boneh-Boyen ID-based encryption scheme and its subspecies (that use a programmable hash function) have an all-but-N security proof, and therefore these ID-based encryption schemes can be used as the encryption scheme $\Sigma$.

For the Boneh-Boyen ID-based encryption scheme, see Reference Literature 1, for example, "Dan Boneh and Xavier Boyen, Efficient selective-ID secure identity based encryption without random oracles. In Christian Cachin and Jan Camenisch, editors, EUROCRYPT 2004, volume 3027 of LNCS, pages 223-238. Springer, Heidelberg, May 2004", or Reference Literature 2 "Nuttapong Attrapadung, Goichiro Hanaoka, and Shota Yamada. New security proof for the Boneh-Boyen IBE: Tight reduction in unbounded multichallenge security. In Lucas Chi Kwong Hui, S. H. Qing, Elaine Shi, and S. M. Yiu, editors, ICICS 14, volume 8958 of LNCS, pages 176-190. Springer, Heidelberg, December 2015". For subspecies of the Boneh-Boyen ID-based encryption scheme, see Reference Literature 3 "Dennis Hofheinz, Tibor Jager, and Eike Kiltz. Short signatures from weaker assumptions. In Dong Hoon Lee and Xiaoyun Wang, editors, ASIACRYPT 2011, volume 7073 of LNCS, pages 647-666. Springer, Heidelberg, December 2011", for example.

Example 2: Boneh-Boyen Signature Scheme

The Boneh-Boyen signature scheme and its subspecies (that use a programmable hash function) have an all-but-N security proof, and therefore these signature schemes can be used as the encryption scheme $\Sigma$.

For the Boneh-Boyen signature scheme, see Reference Literature 1 or Reference Literature 2 listed above, for example. For subspecies of the Boneh-Boyen signature scheme, see Reference Literature 3 listed above, for example.

Example 3: Kiltz Tag-Based Encryption Scheme

The Kiltz tag-based encryption scheme and its subspecies (that use a programmable hash function) have an all-but-N security proof, and therefore these tag-based encryption schemes can be used as the encryption scheme $\Sigma$.

For the Kiltz tag-based encryption scheme, see Reference Literature 4 "Eike Kiltz. Chosen-ciphertext security from tag-based encryption. In Shai Halevi and Tal Rabin, editors, TCC 2006, volume 3876 of LNCS, pages 581-600. Springer, Heidelberg, March 2006", for example. For subspecies of the Kiltz tag-based encryption scheme, see Reference Literature 3 listed above, for example.

Example 4: ABB ID-Based Encryption Scheme

The ABB ID-based encryption scheme and its subspecies (that use a programmable hash function) have an all-but-N security proof, and therefore these ID-based encryption schemes can be used as the encryption scheme $\Sigma$.

For the ABB ID-based encryption scheme, see Reference Literature 5 "Shweta Agrawal, Dan Boneh, and Xavier Boyen. Efficient lattice (H)IBE in the standard model. In Henri Gilbert, editor, EUROCRYPT 2010, volume 6110 of LNCS, pages 553-572. Springer, Heidelberg, May/June 2010", for example. For subspecies of the ABB ID-based encryption scheme, see Reference Literature 6 "Dan Boneh, Craig Gentry, Sergey Gorbunov, Shai Halevi, Valeria Nikolaenko, Gil Segev, Vinod Vaikuntanathan, and Dhinakaran Vinayagamurthy. Fully key-homomorphic encryption, arithmetic circuit ABE and compact garbled circuits. In Phong Q. Nguyen and Elisabeth Oswald, editors, EUROCRYPT 2014, volume 8441 of LNCS, pages 533-556. Springer, Heidelberg, May 2014", for example.

Others: Other than Example 1 to Example 4 described above, the encryption scheme $\Sigma$ such as the one described in Reference Literature 7 "Rotem Tsabary. An equivalence between attribute-based signatures and homomorphic signatures, and new constructions for both. In Yael Kalai and Leonid Reyzin, editors, TCC 2017, Part II, volume 10678 of LNCS, pages 489-518. Springer, Heidelberg, November 2017", or the one described in Reference Literature 8 "Florian Bohl, Dennis Hofheinz, Tibor Jager, Jessica Koch, and Christoph Striecks. Confined guessing: New signatures from standard assumptions. Journal of Cryptology, 28(1): 176-208, January 2015", may also be used.

As described above, the digital watermark system 1 according to this embodiment can make use of an existing encryption scheme as the encryption scheme $\Sigma$, so that it can realize efficient digital watermark without having to build a system from scratch.

<Hardware Configuration>

Figure 3:
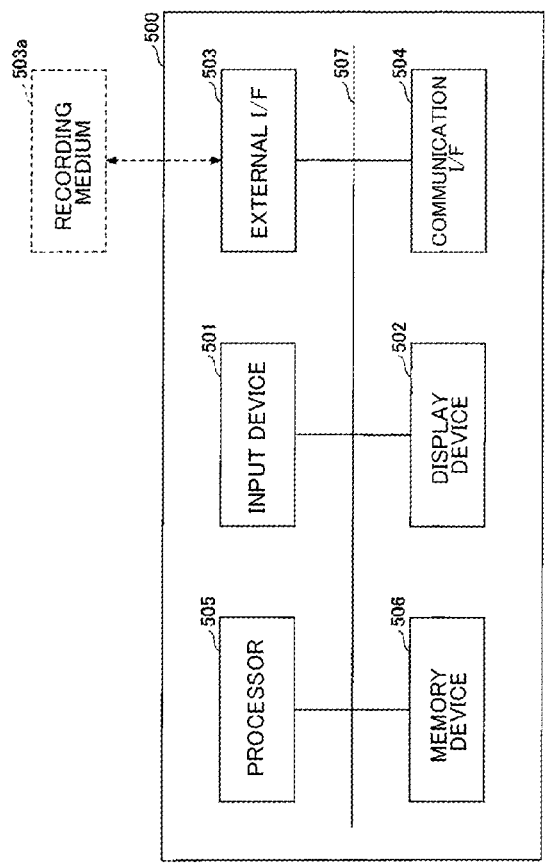
FIG. 3 is a diagram illustrating one example of a hardware configuration of a computer.

Lastly, a hardware configuration of the key generator 10, watermark embedder 20, and watermark extractor 30 included in the digital watermark system 1 according to this embodiment will be described. The key generator 10, watermark embedder 20, and watermark extractor 30 can be realized by a hardware configuration of a computer 500 illustrated in FIG. 3, for example. FIG. 3 is a diagram illustrating one example of a hardware configuration of the computer 500.

The computer 500 shown in FIG. 3 includes an input device 501, a display device 502, an external I/F 503, a communication I/F 504, a processor 505, and a memory device 506. These hardware components are coupled to each other via buses 507 such as to be able to communicate with each other.

The input device 501 is a keyboard, mouse, touchscreen and the like. The display device 502 is a display and the like, for example. The computer 500 may not have at least one of the input device 501 and the display device 502.

The external I/F 503 is an external device interface. The external device includes a recording medium 503a and the like. The computer 500 can perform reading, writing data, or the like from or to the recording medium 503a via the external I/F 503. The recording medium 503a may store one or more programs that realize(s) a key generation processing unit 101, an embedding processing unit 201, and an extraction processing unit 301.

The recording medium 503a includes, for example, a Compact Disc (CD), Digital Versatile Disk (DVD), Secure Digital (SD) memory card), Universal Serial Bus (USB) memory card, and so on.

The communication I/F 504 is an interface for connection with a communication network 40. One or more programs that realize(s) the key generation processing unit 101 may be obtained (downloaded) from a predetermined server device or the like via the communication I/F 504. Similarly, one or more programs that realize(s) the embedding processing unit 201 and the extraction processing unit 301 may be obtained from a predetermined server device or the like via the communication I/F 504.

The processor 505 is one of various computing devices such as the Central Processing Unit (CPU) or Graphics Processing Unit (GPU). The key generation processing unit 101 is realized by one or more programs stored in the memory device 506 of the key generator 10 causing the processor 505 of the key generator 10 to perform the processing. Similarly, the embedding processing unit 201 is realized by one or more programs stored in the memory device 506 of the watermark embedder 20 causing the processor 505 of the watermark embedder 20 to perform the processing. Similarly, the extraction processing unit 301 is realized by one or more programs stored in the memory device 506 of the watermark extractor 30 causing the processor 505 of the watermark extractor 30 to perform the processing.

The memory device 506 is one of various memory devices such as the Hard Disk Drive (HDD), Solid State Drive (SSD), Random Access Memory (RAM), Read Only Memory (ROM), flash memory, and so on, for example. The memory unit 102 can be realized using the memory device 506 of the key generator 10. Similarly, the memory unit 202 can be realized using the memory device 506 of the watermark embedder 20. Similarly, the memory unit 302 can be realized using the memory device 506 of the watermark extractor 30.

The key generator 10, watermark embedder 20, and watermark extractor 30 included in the digital watermark system 1 according to this embodiment can realize the processing described above by the hardware configuration of the computer 500 illustrated in FIG. 3. The computer 500 may have other hardware configurations than the example illustrated in FIG. 3. For example, the computer 500 may include a plurality of processors 505, and may include a plurality of memory devices 506.

The present invention is not limited to the specific disclosure of the embodiment described above and can be modified and changed in various ways, and combined with existing techniques, without departing from the scope set forth in the claims.

REFERENCE SIGNS LIST

1 Digital watermark system
10 Key generator
20 Watermark embedder
30 Watermark extractor
40 Communication network
101 Key generation processing unit
102 Memory unit
201 Embedding processing unit
202 Memory unit
301 Extraction processing unit
302 Memory unit

The invention claimed is:

1. A digital watermark system that realizes digital watermark for a cryptographic function, comprising:
a memory; and
a processor configured to:
take as input a security parameter and generate a watermark embedding key for embedding information representative of a watermark in a circuit that realizes the cryptographic function, and a watermark extraction key for extracting information representative of the watermark from a circuit in which a watermark is embedded;

take as input a master private key used for the cryptographic function, the watermark embedding key, and information representative of a watermark, and generate a circuit, wherein the circuit comprises the watermark and a program code to perform the cryptographic function, and the cryptographic function comprises encryption of data, decryption of data, and generation of a signature of the data; and take as input the watermark extraction key and the circuit, extract information representative of a watermark from the circuit for authenticating the program code.

2. The digital watermark system according to claim 1, wherein the cryptographic function is a function provided by an encryption scheme that is secure based on a computationally difficult problem n and has an all-but-N security proof.

3. The digital watermark system according to claim 2, wherein the processor simulates the problem $\pi$ from the master private key, and generates a circuit that takes as input the problem I, the watermark embedding key, a query in security proof, and a random number used when generating an answer to the query, and simulates the answer, as the circuit with the watermark embedded therein and realizing the cryptographic function.

4. The digital watermark system according to claim 3, wherein the processor verifies whether or not an answer output by inputting the query and the random number to the circuit is correct, using a master public key used for the cryptographic function, and extracts information representative of the watermark, using a total number of the answers that have been verified as correct.

5. A digital watermark method executed by a digital watermark system that realizes digital watermark for a cryptographic function, the method comprising the steps of:

a key generating process in which a security parameter is taken as input and a watermark embedding key for embedding information representative of a watermark in a circuit that realizes the cryptographic function, and a watermark extraction key for extracting information representative of the watermark from a circuit in which a watermark is embedded are generated;

an embedding process in which a master private key used for the cryptographic function, the watermark embedding key, and information representative of a watermark are taken as input, and generating a circuit, wherein the circuit comprises the watermark and a program code to perform the cryptographic function, and the cryptographic function comprises encryption of data, decryption of data, and generation of a signature of the data; and an extraction process in which the watermark extraction key and the circuit, are taken as input, and information representative of a watermark is extracted from the circuit for authenticating the program code.

6. A non-transitory computer-readable recording medium having a program causing a computer to execute the digital watermark method of claim 5.

* * * * *